(12) United States Patent  (10) Patent No.: US 9,300,945 B2
Seo  (45) Date of Patent: Mar. 29, 2016

(54) 3D IMAGE PHOTOGRAPHING APPARATUS AND METHOD

(71) Applicant: SAMSUNG ELECTRONICS CO., LTD., Suwon-si, Gyeonggi-do (KR)

(72) Inventor: Hyeong-chan Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 13/670,140

(22) Filed: Nov. 6, 2012

(65) Prior Publication Data

US 2013/0113886 A1    May 9, 2013

(30) Foreign Application Priority Data

Nov. 7, 2011 (KR) .......................... 10-2011-0115361

(51) Int. Cl.
| | |
|---|---|
| *H04N 13/02* | (2006.01) |
| *G03B 9/00* | (2006.01) |
| *G03B 35/06* | (2006.01) |
| *H04N 5/232* | (2006.01) |
| *H04N 5/353* | (2011.01) |
| *H04N 5/374* | (2011.01) |

(52) U.S. Cl.
CPC ............... *H04N 13/021* (2013.01); *G03B 9/00* (2013.01); *G03B 35/06* (2013.01); *H04N 5/3532* (2013.01); *H04N 5/374* (2013.01)

(58) Field of Classification Search
CPC .......... H04N 13/0239; H04N 13/0055; H04N 13/0296; H04N 13/0497; H04N 13/0242
See application file for complete search history.

(56) References Cited

U.S. PATENT DOCUMENTS

| | | | | | |
|---|---|---|---|---|---|
| 5,570,150 | A | * | 10/1996 | Yoneyama | G03B 35/10 348/E13.007 |
| 5,978,021 | A | * | 11/1999 | Kim | G02B 27/1066 348/218.1 |
| 6,807,295 | B1 | * | 10/2004 | Ono | G02B 23/2415 348/42 |
| 6,809,766 | B1 | * | 10/2004 | Krymski | H04N 5/2353 348/296 |
| 7,019,780 | B1 | * | 3/2006 | Takeuchi | H04N 13/021 348/46 |
| 7,428,378 | B1 | * | 9/2008 | Furlan | G03B 7/16 348/370 |
| 2002/0008907 | A1 | * | 1/2002 | Yamamoto | 359/464 |
| 2003/0076407 | A1 | * | 4/2003 | Uchiyama | H04N 13/021 348/46 |
| 2004/0051791 | A1 | * | 3/2004 | Hashimoto | G06K 9/00013 348/226.1 |
| 2006/0198620 | A1 | * | 9/2006 | Watanabe | A61B 1/045 396/17 |
| 2009/0213233 | A1 | * | 8/2009 | Kido | G03B 7/093 348/208.4 |
| 2013/0113886 | A1 | * | 5/2013 | Seo | G03B 35/06 348/46 |

* cited by examiner

*Primary Examiner* — Sath V Perungavoor
*Assistant Examiner* — Howard D Brown, Jr.
(74) *Attorney, Agent, or Firm* — Drinker Biddle & Reath LLP (57) ABSTRACT

A three-dimensional (3D) image photographing apparatus including: an image sensor; a 3D shutter which is disposed on the light path of the image light and comprises a first opening and a second opening, and which sequentially executes a first operation of passing a first image light by opening only the first opening, a second operation of blocking both the first opening and the second opening, and a third operation of passing a second image light by opening only the second opening; and a control unit which is electrically connected to the image sensor and the 3D shutter and which synchronizes a vertical synchronization signal which is applied to the image sensor with a starting time of the second operation by controlling the image sensor and the 3D shutter.

14 Claims, 5 Drawing Sheets

3D IMAGE PHOTOGRAPHING APPARATUS AND METHOD

CROSS-REFERENCE TO RELATED PATENT APPLICATION

This application claims the benefit of Korean Patent Application No. 10-2011-0115361, filed on Nov. 7, 2011, in the Korean Intellectual Property Office, the disclosure of which is incorporated herein in its entirety by reference.

BACKGROUND

Embodiments relate to three-dimensional (3D) image photographing apparatuses and methods, and more particularly, to a 3D image photographing apparatus for embodying a 3D image without distortion from image lights incident at different angles by using a single image sensor, and a 3D image photographing method thereof.

Recently, various visual media using three-dimensional (3D) images have become more popular, including 3D movies, 3D television, and 3D games. 3D images are characterized by a 3D effect that allows a viewer to feel that he/she is seeing a 3D object. In the past, such 3D images were used in limited fields such as health care. However, recently, 3D images have now influenced everyday people and thus users desire more and more to photograph 3D images. In order to display a 3D image, images that are simultaneously captured at different angles need to be shown to both eyes of a viewer. Thus, an apparatus for capturing a 3D image needs to simultaneously obtain images which a viewer sees at different angles.

Generally, a complementary metal-oxide semiconductor (CMOS) image sensor and a charge-coupled device (CCD) are used as an image sensor for converting an image light into an electrical signal. In particular, the CMOS image sensor uses an electronic shutter, such as a rolling shutter, instead of a mechanical shutter, to be small in size, increase an operation speed, and decrease cost.

The rolling shutter sequentially operates to read data of each pixel of an image sensor line-by-line. However, a captured image may be distorted since points of time when exposures of the pixel lines end are different.

In particular, when capturing a 3D image, image signals obtained from image lights which are incident at different angles overlap with each other, and thus, a left image and a right image are not completely separated. Due to this, a 3D image, which is embodied from the left and right images, may be distorted.

SUMMARY

An embodiment provides a three-dimensional (3D) image photographing apparatus for obtaining a 3D image without distortion from image lights incident at different angles, and a 3D image photographing method thereof.

An embodiment also provides a 3D image photographing apparatus for capturing a 3D image by using a single image sensor, and a 3D image photographing method thereof.

According to an embodiment, there is provided a three-dimensional (3D) image photographing apparatus including: an image sensor which comprises a plurality of pixel lines and converts an image light into an electrical signal by sequentially exposing the plurality of pixel lines; a 3D shutter which is disposed on a light path of the image light, which is incident on the image sensor, and comprises a first opening and a second opening, and which sequentially executes a first operation of passing a first image light by opening only the first opening, a second operation of blocking both the first opening and the second opening, and a third operation of passing a second image light by opening only the second opening; and a control unit which is electrically connected to the image sensor and the 3D shutter and which synchronizes a vertical synchronization signal which is applied to the image sensor with a starting time of the second operation by controlling the image sensor and the 3D shutter.

When capturing a 3D moving image, the control unit may execute a fourth operation for blocking both the first opening and the second opening after executing the third operation and then may repeatedly execute the first through fourth operations, by controlling the 3D shutter.

The image sensor may be a complementary metal-oxide semiconductor (CMOS) image sensor comprising a rolling shutter.

A duration time $t3$ of the second operation may satisfy an equation $D+t1-T \le t3 < D$, wherein $D$ is the difference between an exposure starting time of a pixel line which is first exposed and an exposure starting time of a pixel line which is finally exposed, $t1$ is an exposure time of each of the pixel lines of the image sensor, and $T$ is a period of the vertical synchronization signal which is applied to the image sensor.

The 3D shutter may include a liquid crystal device for transmitting or blocking light according to an application of an electrical signal.

The 3D shutter may include a blocking plate which is movable to open or block at least one of the first and second openings according to an application of a signal.

The image sensor may generate a first image signal corresponding to the first image light and a second image signal corresponding to the second image light by sequentially exposing the plurality of pixel lines.

The 3D image photographing apparatus may further include a gain correction unit for correcting a difference between levels of signals which are generated by each of the pixel lines of the first image signal and the second image signal.

According to another embodiment, there is provided a 3D image photographing method including: inputting a first image light to an image sensor comprising a plurality of pixel lines; blocking the first image light, which is incident on the image sensor, for a predetermined time, at a time synchronized with a vertical synchronization signal which is applied to the image sensor; inputting a second image light, which is incident at an angle different from an incidence angle of the first image light, to the image sensor; generating a first image signal and a second image signal, by converting the first image light and the second image light into electrical signals by sequentially exposing a plurality of pixel lines; and processing the first image signal and the second image signal.

The 3D image photographing method may further include, when capturing a moving image, blocking the second image light, which is incident on the image sensor, for a predetermined time, after the inputting of the second image light to the image sensor.

The image sensor may be a complementary metal-oxide semiconductor (CMOS) image sensor comprising a rolling shutter.

The blocking of the first image light for the predetermined time may include blocking the first image light for a time $t3$ satisfying an equation $D+t1-T \le t3 < D$, wherein $D$ is the difference between an exposure starting time of a pixel line which is first exposed and an exposure starting time of a pixel line which is finally exposed, $t1$ is an exposure time of each of the pixel lines of the image sensor, and T is a period of a vertical synchronization signal which is applied to the image sensor.

The processing of the first image signal and the second image signal may include correcting a difference between levels of signals which are generated by each of the pixel lines of the first image signal and the second image signal.

The first image light may be generated by opening only a first opening of a 3D shutter including the first opening and a second opening, and the second image light may be generated by opening only the second opening of the 3D shutter.

The 3D shutter may include a liquid crystal device for transmitting or blocking light according to an application of an electrical signal.

The 3D shutter may include a blocking plate which is movable to open or block at least one of the first and second openings according to an application of a signal.

The 3D image photographing apparatus may obtain a 3D image without distortion from image lights incident at different angles. In addition, the 3D image photographing apparatus may capture a 3D image by using a single image sensor.

BRIEF DESCRIPTION OF THE DRAWINGS

The above and other features will become more apparent from the following detailed description of exemplary embodiments thereof with reference to the attached drawings in which.

DETAILED DESCRIPTION

Embodiments will now be described more fully with reference to the accompanying drawings, in which exemplary embodiments are shown. As used herein, the term "and/or" includes any and all combinations of one or more of the associated listed items. Expressions such as "at least one of," when preceding a list of elements, modify the entire list of elements and do not modify the individual elements of the list.

Figure 1:
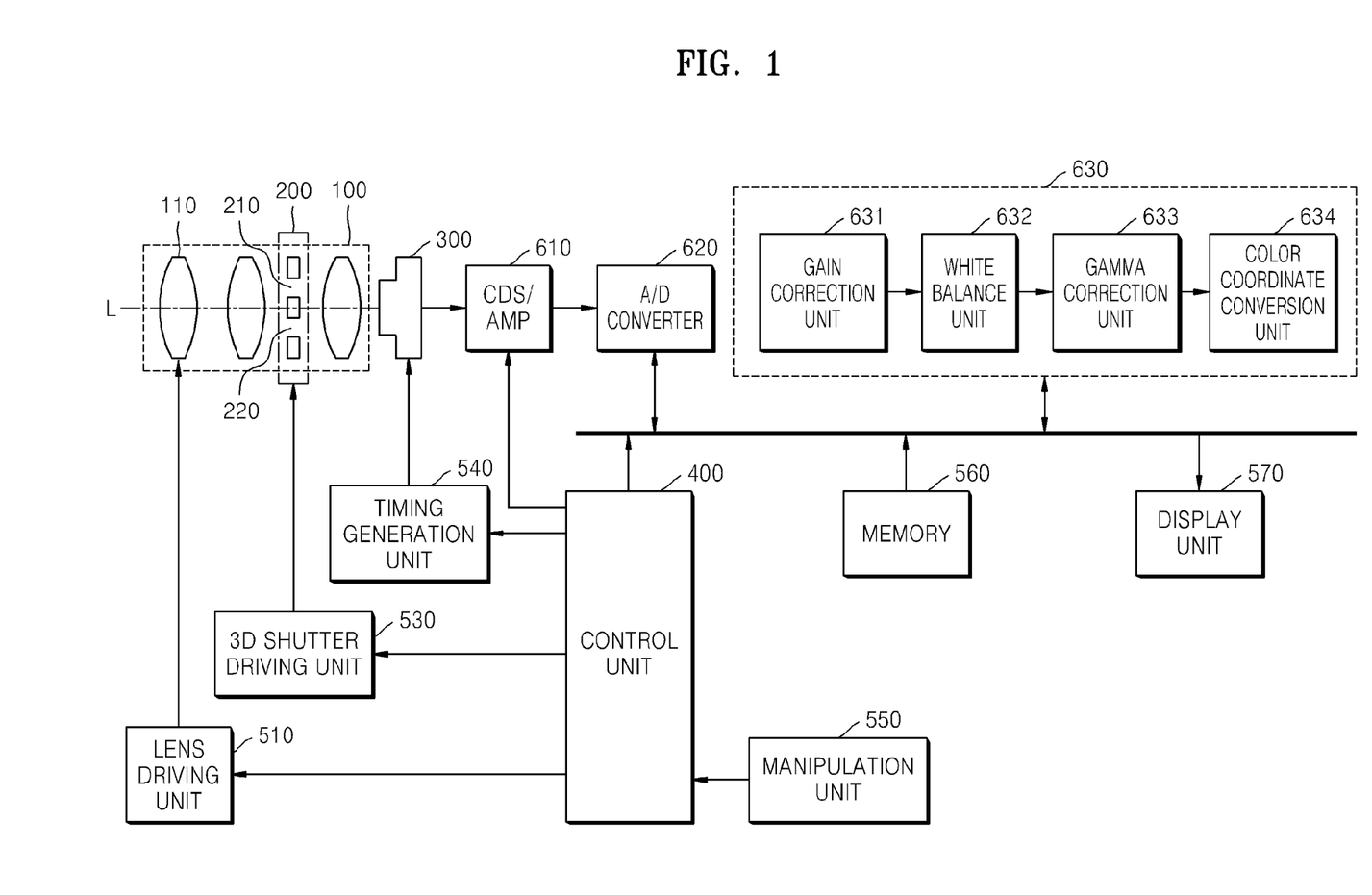
FIG. 1 is a block diagram of a three-dimensional (3D) image photographing apparatus according to an embodiment.

FIG. 1 is a block diagram of a three-dimensional (3D) image photographing apparatus according to an embodiment.

Referring to FIG. 1, the 3D image photographing apparatus includes an image sensor 300, a 3D shutter 200, and a control unit 400.

The image sensor 300 includes a plurality of pixel lines and converts an image light into an electrical signal by sequentially operating the plurality of pixel lines. The 3D shutter 200 is disposed on a light path and includes a first opening 210 and a second opening 220. In addition, the 3D shutter 200 sequentially executes a first operation of passing a first image light by opening only the first opening 210, a second operation of blocking both the first opening 210 and the second opening 220, and a third operation of passing a second image light by opening only the second opening 220. The control unit 400 is electrically connected to the image sensor 300 and the 3D shutter 200, and synchronizes a vertical synchronization signal which is applied to the image sensor 300 with a starting time of the second operation by controlling the image sensor 300 and the 3D shutter 200.

The image sensor 300 may be a complementary metal-oxide semiconductor (CMOS) sensor array in which a plurality of CMOS sensors are disposed in a matrix including a plurality of rows and a plurality of columns, and may adjust a time used for obtaining an electrical signal by controlling an incident light by using a rolling shutter. The pixel lines, each of which is constituted with a single row or a set of more than two adjacent rows, are disposed in the image sensor 300, and the image light is converted into the electrical signal by sequentially exposing the plurality of pixel lines by using the rolling shutter.

A timing generator 540 applies a timing signal to the image sensor 300. The timing generator 540 generates a vertical synchronization signal, and a period of a frame of the image sensor 300 is determined depending on a period of the vertical synchronization signal.

The image sensor 300, including the rolling shutter, may rapidly output an image and be advantageous for miniaturization and low cost since the exposure time thereof is controlled by only an electronic shutter. However, there are differences between exposure starting times of the pixel lines, and thus, an exposure of a pixel line which is first exposed in a next frame may start before an exposure of a pixel line which is finally exposed in the current frame ends, thereby images of two frames overlap for some time. This is described later.

The 3D image photographing apparatus according to the current embodiment further includes an optical system 100 in front of the image sensor 300, namely, in the direction of a subject.

The optical system 100 includes a plurality of lenses 110 and focuses an external image light onto an imaging surface of the image sensor 300.

The interval between the lenses 110 may be changed to perform zoom magnification or focusing. The lenses 110 are disposed in a direction of an optical axis L, and the optical axis L corresponds to a straight line connecting optical centers of the lenses 110.

The lenses 110 may be driven by a lens driving unit 510 including a driver such as zoom motor (not shown), thereby changing positions of the lenses 110. The lenses 110 may include a zoom lens (not shown) for enlarging or reducing a size of a subject and a focus lens for controlling a focus of the subject.

The lens driving unit 510 operates in response to control signals from the control unit 400, and controls positions of the lenses 110 so that the lenses 100 have any one of a plurality of magnifications.

The optical system 100 may further include an aperture (not shown) for controlling the amount of light which is incident on the image sensor 300, and a shutter (not shown) for controlling whether or not to input light.

As stated above, the 3D shutter 200 includes the first opening 210 and the second opening 220. The 3D shutter 200 may pass a first image light by opening only the first opening 210, may pass a second image light by opening only the second opening 220, or may simultaneously shut the first opening 210 and the second opening 220. The first image light and the second image light are incident on the image sensor 300 at different angles, and are converted into a first image signal and a second image signal, respectively, by the image sensor 300.

In order to provide a 3D image, images that are captured at different angles need to be simultaneously shown to both eyes of a viewer, and thus, an apparatus for capturing a 3D image needs to substantially simultaneously obtain images viewed at different angles. The first image light and second image light correspond to the right eye and left eye of a viewer, respectively, and a 3D image may be obtained from the first image signal obtained from the first image light and the second image signal obtained from the second image light.

The 3D shutter 200 is driven by a 3D shutter driving unit 530. The 3D shutter driving unit 530, by interacting with a photographing operation of the image sensor 300, controls the 3D shutter 200 so that the 3D shutter 200 sequentially executes a first operation of passing a first image light by opening only the first opening 210, a second operation of blocking all the first opening 210 and the second opening 220, and a third operation of passing a second image light by opening only the second opening 220. At this time, the control unit 400 synchronizes the vertical synchronization signal, which is applied to the image sensor 300, with the starting time of the second operation, and a state, in which the first opening 210 and the second opening 220 are shut, is maintained for a predetermined time, as described below.

In addition, although, in the current embodiment, a case where the 3D shutter 200 is included in the optical system 100 is illustrated, the present general inventive concept is not limited thereto, and the 3D shutter 200 may be disposed between the optical system 100 and the image sensor 300 or may be disposed in front of the optical system 100, namely, on the subject side of the optical system.

The 3D image photographing apparatus according to the current embodiment further includes a correlated double sampling (CDS)/amplifier (AMP) unit 610, an ND converter 620, and an image signal processor 630.

An electrical signal output from the image sensor 300 is input to the CDS/AMP unit 610. The CDS/AMP unit 610 amplifies the input electrical signal to any level as well as removes low frequency noise from the input electrical signal. An analog signal output from the CDS/AMP unit 610 is input to the ND converter 620 and then is converted into a digital signal.

The image signal processor 630 includes a gain correction unit 631 for adjusting the level of a signal of a pixel line for the digital signal, a white balance unit 632 for correcting the white balance by equally adjusting levels of red (R), green (G), and blue (B) signals, a gamma correction unit 633 for performing a contrast conversion depending on a gamma coefficient, and a color coordinate conversion unit 634 for generating a luminance signal Y and chrominance signals Cb and Cr by converting color coordinates.

An image signal processed by the image signal processor 630 may be stored in a memory 560 and/or may be displayed on a display unit 570 embodied by a liquid crystal display (LCD), an organic light-emitting diode (OLED) display, or the like.

A manipulation unit 550 receives manipulations from a user. The manipulation unit 550 may be embodied by buttons or a touch screen or other input mechanism for manipulating a menu or dials. In addition, the manipulation unit 550 may include a button for controlling 3D still image photographing or 3D moving image photographing, and a user may select a still image photographing mode or a moving image photographing mode through the manipulation unit 550.

FIGS. 2A through 2D are conceptual diagrams sequentially illustrating operation states of the 3D shutter 200 included in the 3D image photographing apparatus of FIG. 1.

Figure 2A:
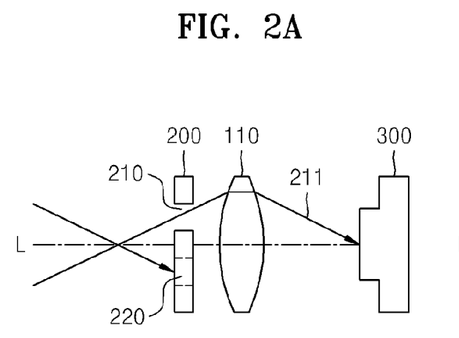
FIGS. 2A through 2D are conceptual diagrams sequentially illustrating operation states of a 3D shutter included in the 3D image photographing apparatus of FIG. 1.

Referring to FIG. 2A, the 3D shutter 200, including the first opening 210 and the second opening 220, executes a first operation in which the first opening 210 is opened and the second opening 220 is closed.

An image light which is incident from the outside passes through the first opening 210, and thus, a first image light 211 is generated. The first image light 211 is input to the image sensor 300, and the image sensor 300 generates a first image signal by converting the first image light 211 into an electrical signal.

Figure 2B:
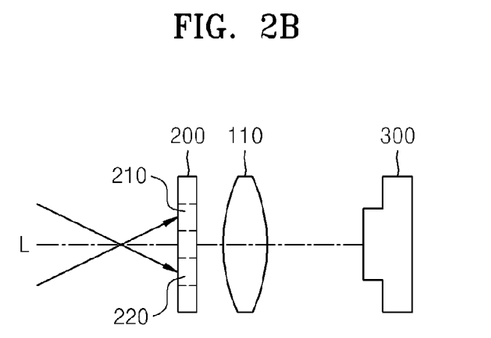

Referring to FIG. 2B, the 3D shutter 200 executes a second operation in which both the first opening 210 and the second opening 220 are simultaneously closed. Thus, an image light which is incident from the outside is blocked.

Figure 2C:
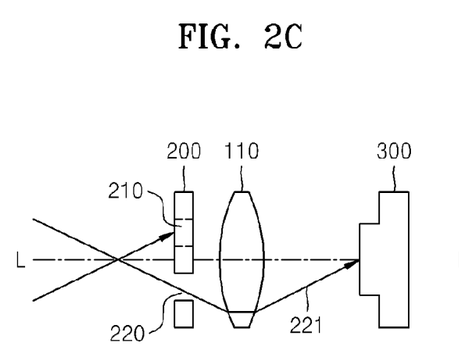

Referring to FIG. 2C, the 3D shutter 200 executes a third operation in which the first opening 210 is closed and the second opening 220 is opened.

An image light which is incident from the outside passes through the second opening 220, and thus, a second image light 221 is generated. The second image light 221 is input to the image sensor 300, and the image sensor 300 generates a second image signal by converting the second image light 221 into an electrical signal.

Figure 2D:
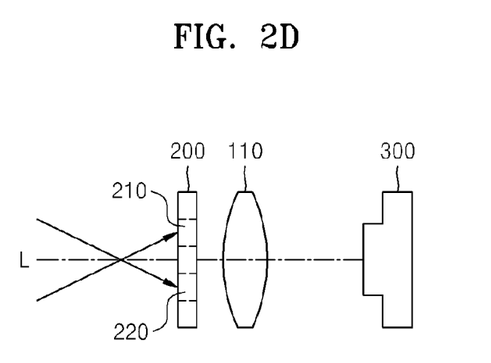

Referring to FIG. 2D, the 3D shutter 200 executes a fourth operation in which both the first opening 210 and the second opening 220 are simultaneously closed. The fourth operation has the same configuration and effect as the second operation.

The first image light 211 and the second image light 221 are incident on the image sensor 300 at different angles, and the difference between the different angles is designed to correspond to both eyes of a viewer. Thus, a 3D image may be embodied from the first image signal obtained from the first image light 211 and the second image signal obtained from the second image light 221.

When capturing a 3D still image, the first operation, the second operation, and the third operation may be sequentially executed one time.

However, when capturing a 3D moving image, the fourth operation is executed after executing the first through third operations, and then the first through fourth operations are repeatedly executed after executing the fourth operation. A user may start a 3D moving image photographing mode through the manipulation unit 550 of FIG. 1. The first through fourth operations are repeatedly executed by a start manipulation from the user, and the repeated execution is continued until the user directs the end of the photographing through the manipulation unit 550.

Figure 3:
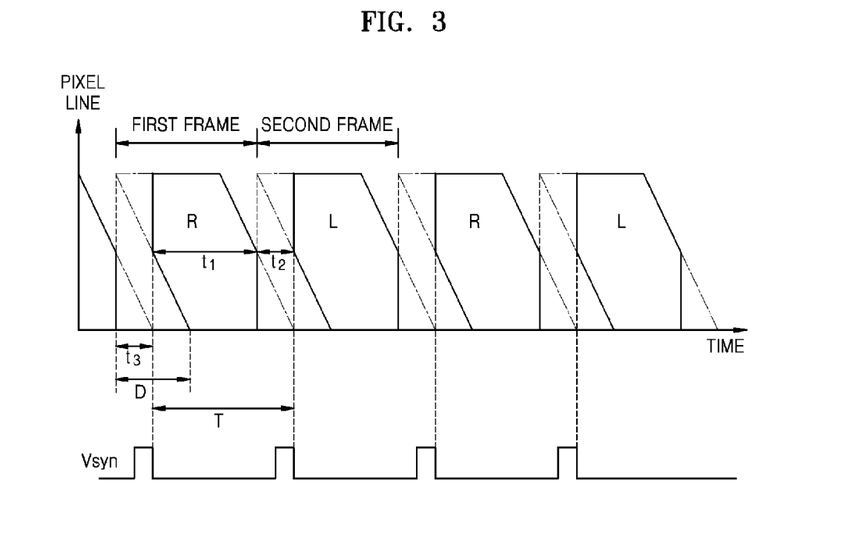
FIG. 3 is a conceptual diagram illustrating an image signal which is generated by an image sensor of FIGS. 2A through 2D.
Figure 4:
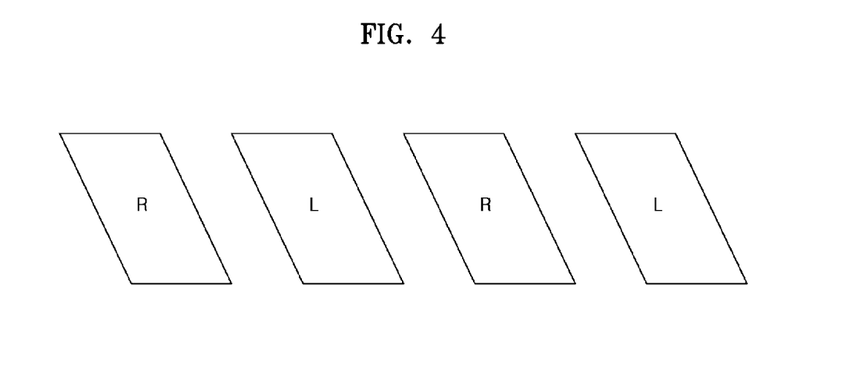
FIG. 4 is a conceptual diagram illustrating an image signal after correcting a gain of the image signal of FIG. 3.

FIG. 3 is a conceptual diagram illustrating an image signal which is generated by the image sensor 300 of FIG. 2, and FIG. 4 is a conceptual diagram illustrating an image signal after correcting a gain of the image signal of FIG. 3.

Referring to FIG. 3, a first image signal R formed from the first image light 211 and a second image signal L formed from the second image light 221 are illustrated. The horizontal axis of FIG. 3 indicates time, and the vertical axis of FIG. 3 indicates a pixel line. A dashed line indicates an image signal which is generated by the image sensor 300 when the 3D shutter 200 does not perform the second operation of simultaneously closing the first opening 210 and the second opening 220.

A vertical synchronization signal Vsyn for determining a period T of frames is applied to the image sensor 300. The first image signal R and the second image signal L are alternately generated in each of the frames.

As stated above, the image sensor 300 includes a plurality of pixel lines, and converts an image light, which is incident thereon, into an electrical signal by sequentially exposing the plurality of pixel lines by using the rolling shutter, thereby generating an image signal. Thus, a difference occurs between exposure starting times of the pixel lines.

In FIG. 3, a symbol D indicates a difference between an exposure starting time of a pixel line that starts first an exposure and an exposure starting time of a pixel line that starts finally an exposure, and the difference D is determined by the velocity of the rolling shutter and the number of pixel lines.

An exposure time t1 of each of the pixel lines is determined by initial settings of the image sensor 300. After each of the pixel lines is exposed for a predetermined time t1, i.e., the exposure time, by using the rolling shutter, an image signal is read for a predetermined time t2 from each of the pixel lines. The sum of the predetermined time t1 and the predetermined time t2 is equal to the period T of the vertical synchronization signal, and, after a reading of image signals from a frame (a first frame) is finished, the pixel line is reset by the vertical synchronization signal and then an exposure of a next frame (a second frame) is started.

However, due to the difference between the exposure starting times of the pixel lines, although a pixel line, which starts first an exposure in a first frame, finishes a reading of image signals and then starts an exposure of a second frame, a pixel line, which starts an exposure later, may be still proceeding with an exposure of the first frame. In this case, as illustrated by a dotted line, the first frame and the second frame are simultaneously exposed, and thus, a first image signal R and a second image signal L overlap.

In the current embodiment, an image light which is incident on the image sensor 300 is blocked for a predetermined time t3, to prevent overlap between the first image signal R and the second image signal L. That is, the second operation of closing the first and second openings 210 and 220 of the 3D shutter 200 is performed.

The second operation is performed between the first operation of opening only the first opening 210 and the third operation of opening only the second opening 220, and the control unit of 400 of FIG. 1 synchronizes the vertical synchronization signal Vsyn with a starting signal of the second operation. In addition, a duration time t3 of the second operation satisfies the following Equation 1.

$$D+t1-T \leq t3 < D \quad (1)$$

D is a difference between an exposure starting time of a pixel line which is first exposed and an exposure starting time of a pixel line which is finally exposed, t1 is an exposure time of each of the pixel lines of the image sensor 300, and T is a period of the vertical synchronization signal which is applied to the image sensor 300.

When capturing a moving image, the first image signal R and the second image signal L are alternately obtained from a starting point of time of a moving image capture to an ending point of time of the moving image capture, and the image light which is incident on the image sensor 300 is blocked for a time in which two frames are simultaneously exposed.

The first image signal R and second image signal L generated from the image sensor 300 do not necessarily have equal strength, i.e., an equal brightness in all the pixel lines. Although each of the pixel lines is exposed for the predetermined time t1 by the rolling shutter included in the image sensor 300, the image light is not incident on some of the pixel lines by the second operation and/or fourth operation of the 3D shutter 200 for a part of the predetermined time t1.

Due to a difference between times for which the image light is incident on the pixel lines, levels of image signals, each of which is obtained from each of the pixel lines, are different. Thus, it is necessary to correct the levels of the image signals, each of which is obtained from each of the pixel lines, to have the same level.

FIG. 4 illustrates a state in which the levels of the image signals, each of which is obtained from each of the pixel lines, have been corrected to have the same level. A vertical axis of each of the image signals indicates a pixel line, and a horizontal axis of each of the image signals illustrates the level of each of the image signals.

The image signals output from the image sensor 300 are converted into digital signals by the A/D converter 620 of FIG. 1. Signals corresponding to defective pixels from among the digital signals are corrected by a gain correction unit 631 included in the image signal processor 630 of FIG. 1, and the digital signals of the pixel lines are corrected so that the levels of the digital signals become equal to each other.

However, the present general inventive concept is not limited thereto, and level correction of signals of the pixel lines may be performed in a step of processing analog signals, i.e., the image signals.

Thus, by removing a region, in which the first image signal R and the second image signal L overlap, and correcting a lowering of a signal level, which is generated in some of the pixel lines during the removing, through the gain correction unit 631, it is possible to obtain the first image signal R and the second image signal L which are separated from each other and it is possible to embody a 3D image without distortion from the separated first and second image signals R and L.

Figure 5:
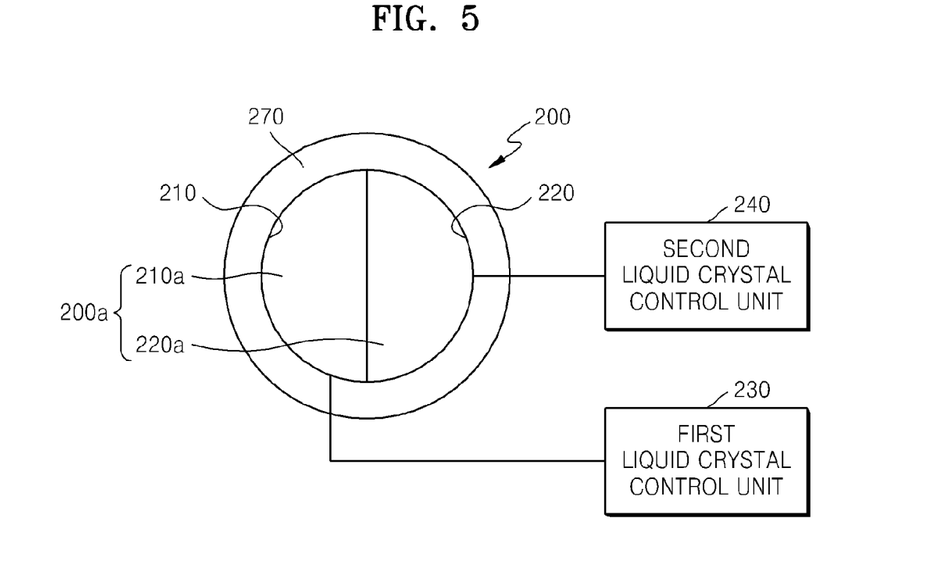
FIG. 5 is a plan view schematically illustrating the 3D shutter included in the 3D image photographing apparatus of FIG. 1, according to an embodiment.

FIG. 5 is a plan view schematically illustrating the 3D shutter 200 included in the 3D image photographing apparatus of FIG. 1, according to an embodiment.

Referring to FIG. 5, the 3D shutter 200 includes a shutter plate 270, which includes a first opening 210 and a second opening 220, and a liquid crystal device 200a for transmitting or blocking light according to an application of an electrical signal.

The liquid crystal device 200a includes a first liquid crystal unit 210a corresponding to the first opening 210 and a second liquid crystal unit 220a corresponding to the second opening 220. The first liquid crystal unit 210a and the second liquid crystal unit 220a are controlled by a first liquid crystal control unit 230 and a second liquid crystal control unit 240, respectively, which control a liquid crystal arrangement.

Thus, the first opening 210 transmits or blocks a light depending on whether the first liquid crystal unit 210a transmits the light, and the second opening 220 transmits or blocks the light depending on whether the second liquid crystal unit 220a transmits the light. The 3D shutter 200 according to the current embodiment sequentially executes a first operation of passing an image light through only the first opening 210, a second operation of blocking all the first opening 210 and the second opening 220, and a third operation of passing an image light through only the second opening 220, to capture a 3D image.

When capturing a 3D moving image, a fourth operation, which blocks both the first opening 210 and the second opening 220, is executed after executing the third operation, and then the first through fourth operations are repeatedly executed after executing the fourth operation.

Figure 6:
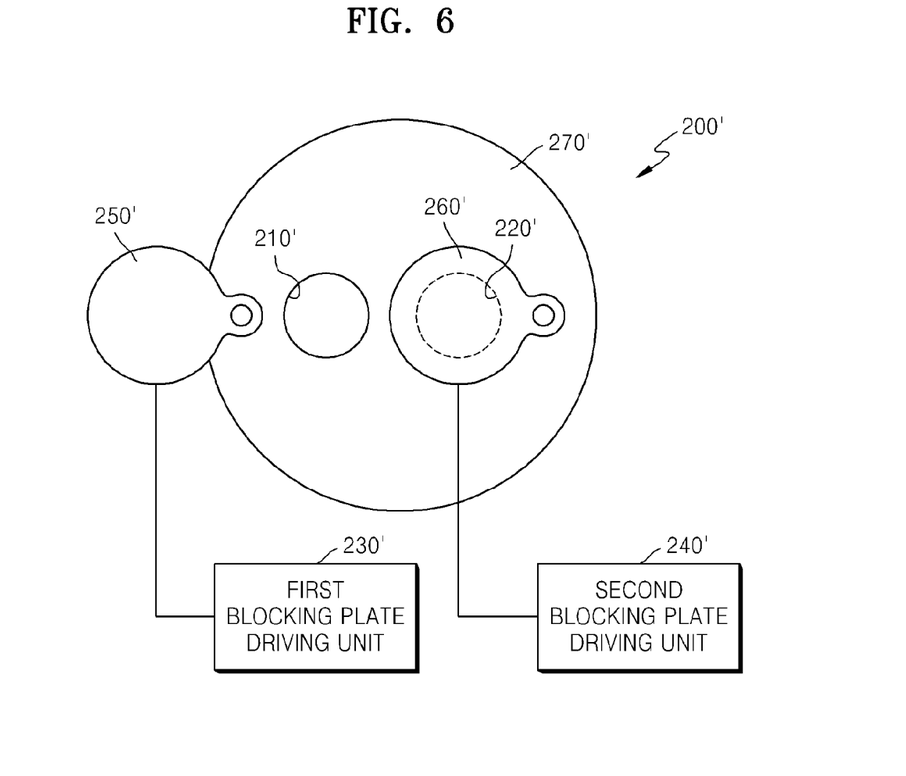
FIG. 6 is a plan view schematically illustrating a 3D shutter included in the 3D image photographing apparatus of FIG. 1, according to another embodiment.

FIG. 6 is a plan view schematically illustrating a 3D shutter 200' included in the 3D image photographing apparatus of FIG. 1, according to another embodiment.

Referring to FIG. 6, the 3D shutter 200' includes first and second blocking plates 250' and 260' which may be moved between a position for blocking light and a position for passing light according to an application of a signal.

That is, the 3D shutter 200' includes a shutter plate 270', which includes a first opening 210' and a second opening 220', the first blocking plate 250' for opening or closing the first opening 210', and the second blocking plate 260' for opening or closing the second opening 220'.

The first opening 210' and the second opening 220' transmit or block an image light by using a first blocking plate driving unit 230' and a second blocking plate driving unit 240', respectively. The 3D shutter 200' according to the current embodiment sequentially executes a first operation of passing an image light through only the first opening 210', a second operation of blocking all the first opening 210' and the second opening 220', and a third operation of passing an image light through only the second opening 220', to capture a 3D image.

However, the present general inventive concept is not limited thereto, and a single blocking plate may alternately block the first opening 210' and the second opening 220', or a light blocking element for simultaneously blocking the first opening 210' and the second opening 220' may be further included in the 3D shutter 200'.

Figure 7:
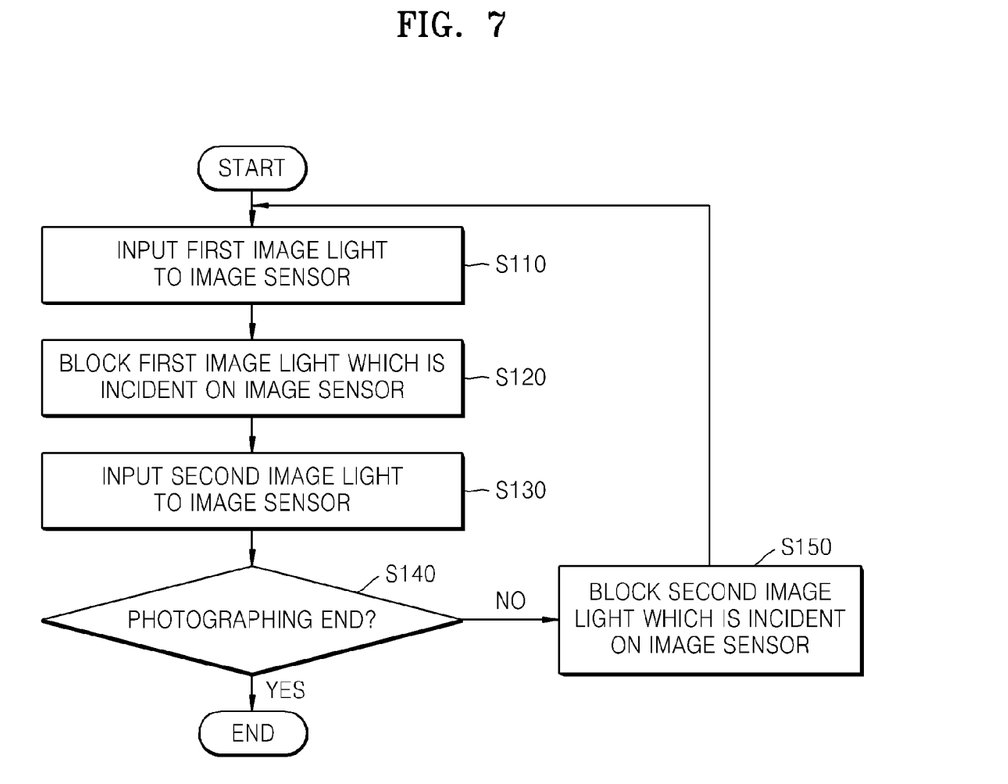
FIG. 7 is a flowchart illustrating photographing operations which are executed by the 3D image photographing apparatus of FIG. 1.

FIG. 7 is a flowchart illustrating photographing operations which are executed by the 3D image photographing apparatus of FIG. 1.

Referring to FIG. 7, if a photographing is started by the manipulation unit 550 of FIG. 1, operation S110 of inputting a first image light to the image sensor 300 of FIG. 1, operation S120 of blocking the first image light which is incident on the image sensor 300, and operation S130 of inputting a second image light to the image sensor 300 are sequentially executed. After operation S130 of inputting the second image light to the image sensor 300, it is confirmed whether the photographing has been ended (operation S140). If the photographing has not been ended, operation S150 of blocking the second image light which is incident on the image sensor 300 is executed. Then, another 3D image may be captured by executing operations S110 through S130 again. This repetition of the 3D photographing may be applied, in particular, to a case of capturing a moving image.

The first image light and the second image light may be obtained by opening the first opening 210 of the 3D shutter 200 of FIG. 1 and the second opening 220 of the 3D shutter 200, respectively.

The first image light and the second image light may be converted into a first image signal and a second image signal, respectively, by sequentially exposing a plurality of pixel lines of the image sensor 300 by using the rolling shutter, and, thereafter, the first image signal and the second image signal may be processed by the image signal processor 630 of FIG. 1.

Using the photographing operations, it is possible to obtain the first image signal and the second image signal which do not overlap, and it is possible to embody a 3D image without distortion through an image processing of the first image signal and the second image signal.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A three-dimensional (3D) image photographing apparatus comprising:
   an image sensor which comprises a plurality of pixel lines and converts an image light into an electrical signal by sequentially exposing the plurality of pixel lines;
   a 3D shutter which is disposed on a light path of the image light, which is incident on the image sensor, and comprises a first opening and a second opening, and which sequentially executes a first operation of passing a first image light by opening only the first opening, a second operation of blocking both the first opening and the second opening, and a third operation of passing a second image light by opening only the second opening; and
   a control unit which is electrically connected to the image sensor and the 3D shutter and which synchronizes a vertical synchronization signal which is applied to the image sensor with a starting time of the second operation by controlling the image sensor and the 3D shutter;
   wherein a duration time $t3$ of the second operation satisfies an equation $D+t1-T \leq t3 < D$, wherein D is the difference between the exposure starting time of a pixel line which is first exposed and the exposure starting time of a pixel line which is finally exposed, $t1$ is the exposure time of each of the pixel lines of the image sensor, and T is the period of the vertical synchronization signal which is applied to the image sensor.

2. The 3D image photographing apparatus of claim 1, wherein, when capturing a 3D moving image, the control unit executes a fourth operation for blocking both the first opening and the second opening after executing the third operation and then repeatedly executes the first through fourth operations, by controlling the 3D shutter.

3. The 3D image photographing apparatus of claim 1, wherein the image sensor is a complementary metal-oxide semiconductor (CMOS) image sensor comprising a rolling shutter.

4. The 3D image photographing apparatus of claim 1, wherein the 3D shutter comprises a liquid crystal device for transmitting or blocking light according to an application of an electrical signal.

5. The 3D image photographing apparatus of claim 1, wherein the 3D shutter comprises a blocking plate which is movable to open or block at least one of the first and second openings according to an application of a signal.

6. The 3D image photographing apparatus of claim 1, wherein the image sensor generates a first image signal corresponding to the first image light and a second image signal corresponding to the second image light by sequentially exposing the plurality of pixel lines.

7. The 3D image photographing apparatus of claim 6, further comprising a gain correction unit for correcting a difference between levels of signals which are generated by each of the pixel lines of the first image signal and the second image signal.

8. A 3D image photographing method comprising:
   inputting a first image light to an image sensor comprising a plurality of pixel lines;
   blocking the first image light, which is incident on the image sensor, for a predetermined time, at a time synchronized with a vertical synchronization signal which is applied to the image sensor;
   inputting a second image light, which is incident at an angle different from an incidence angle of the first image light, to the image sensor;
   generating a first image signal and a second image signal, by converting the first image light and the second image light into electrical signals by sequentially exposing a plurality of pixel lines; and
   processing the first image signal and the second image signal;
   wherein the blocking of the first image light for the predetermined time comprises blocking the first image light for a time $t3$ satisfying an equation $D+t1-T \leq t3 < D$, wherein D is the difference between the exposure starting time of a pixel line which is first exposed and the exposure starting time of a pixel line which is finally exposed, $t1$ is the exposure time of each of the pixel lines of the image sensor, and T is a period of a vertical synchronization signal which is applied to the image sensor.

9. The 3D image photographing method of claim 8, further comprising, when capturing a moving image, blocking the second image light, which is incident on the image sensor, for a predetermined time, after the inputting of the second image light to the image sensor.

10. The 3D image photographing method of claim 8, wherein the image sensor is a complementary metal-oxide semiconductor (CMOS) image sensor comprising a rolling shutter.

11. The 3D image photographing method of claim 8, wherein the processing of the first image signal and the second image signal comprises correcting a difference between levels of signals which are generated by each of the pixel lines of the first image signal and the second image signal.

12. The 3D image photographing method of claim 8, further comprising a 3D shutter having a first opening and the second opening, and wherein the first image light is generated by opening only the first opening of the 3D shutter, and the second image light is generated by opening only the second opening of the 3D shutter.

13. The 3D image photographing method of claim 12, wherein the 3D shutter comprises a liquid crystal device for transmitting or blocking light according to an application of an electrical signal.

14. The 3D image photographing method of claim 12, wherein the 3D shutter comprises at least one blocking plate which is movable to open or block at least one of the first and second openings according to an application of a signal.

* * * * *